United States Patent
Mallinowski

(10) Patent No.: US 12,472,474 B2
(45) Date of Patent: Nov. 18, 2025

(54) METHOD AND DEVICE FOR PRODUCING A SUSPENSION

(71) Applicant: Ivan Mallinowski, Wassenberg (DE)

(72) Inventor: Ivan Mallinowski, Wassenberg (DE)

(*) Notice: Subject to any disclaimer, the term of this patent is extended or adjusted under 35 U.S.C. 154(b) by 237 days.

(21) Appl. No.: 18/229,128

(22) Filed: Aug. 1, 2023

(65) Prior Publication Data
US 2024/0017222 A1    Jan. 18, 2024

Related U.S. Application Data

(63) Continuation of application No. PCT/EP2021/087701, filed on Dec. 28, 2021.

(51) Int. Cl.
| | | |
|---|---|---|
| A23C 11/10 | (2025.01) | |
| B01D 39/10 | (2006.01) | |
| B01F 23/50 | (2022.01) | |
| B01F 23/53 | (2022.01) | |
| B01F 27/808 | (2022.01) | |
| B01F 27/90 | (2022.01) | |
| B01F 35/00 | (2022.01) | |
| B01F 35/71 | (2022.01) | |
| B01F 35/91 | (2022.01) | |
| B01F 35/90 | (2022.01) | |
| B01F 101/06 | (2022.01) | |

(52) U.S. Cl.
CPC .......... B01F 23/53 (2022.01); A23C 11/103 (2013.01); B01D 39/10 (2013.01); B01F 23/51 (2022.01); B01F 27/808 (2022.01); B01F 27/90 (2022.01); B01F 35/187 (2022.01); B01F 35/717613 (2022.01); B01F 35/91 (2022.01); *B01F 2035/99* (2022.01); *B01F 2101/06* (2022.01)

(58) Field of Classification Search
CPC ......... A47J 31/18; A47J 31/42; B01F 35/187; B01F 27/808; B01F 23/53; B01F 23/51; A23C 11/103; A23C 11/10; A23L 11/65; A23L 11/60
See application file for complete search history.

(56) References Cited

U.S. PATENT DOCUMENTS

| | | | | |
|---|---|---|---|---|
| 3,871,273 A | * | 3/1975 | Hsieh ...................... | A47J 31/42 |
| | | | | 99/323.3 |
| 2018/0295849 A1 | * | 10/2018 | Earl ......................... | A23G 9/38 |

OTHER PUBLICATIONS

CN 110432335 A Equivalent abstract Nov. 12, 2019 (Year: 2019).*

* cited by examiner

*Primary Examiner* — Vera Stulii

(57) ABSTRACT

A method for producing a suspension, wherein plant parts are comminuted in portions and mixed with water so that the water and the plant parts form the suspension, and a pomace remaining from the plant parts is separated from the suspension. A device for producing a suspension, the device including a mixing chamber and a mixing element in the mixing chamber for mixing a portion of comminuted plant parts with water so that the water and the plant parts form the suspension, and an outlet on the mixing chamber for letting the suspension out of the mixing chamber so that a pomace remaining from the plant parts is retained in the mixing chamber. In order to accelerate production, the plant parts are mashed to a pulp while the water is pressed at a positive pressure through the pulp and through a filter which retains the pomace.

6 Claims, 4 Drawing Sheets

METHOD AND DEVICE FOR PRODUCING A SUSPENSION

RELATED APPLICATIONS

This application is a continuation of International application PCT/EP2021/0877001 filed on Dec. 28, 2021 claiming priority from German patent application DE 10 2021 104 742.0 filed on Feb. 26, 2021, both of which are incorporated in their entirety by this reference.

FIELD OF THE INVENTION

The invention relates to a method for producing a suspension. The invention furthermore relates to a device for producing the suspension.

A generic device that facilitates performing a generic type of the method recited supra is offered by Spring Lane GmbH, Duesseldorf, DE under the product designation "Mandelmilchbereiter Mila". The known device includes a mixing chamber with a mixing element configured as a rotatable blade arranged therein. In order to produce a suspension, the plant parts are placed in the mixing chamber and the water is placed into a storage container arranged at an outside of the device. After closing the mixing chamber and switching on the device, the mixing chamber is heated, the plant parts included therein are comminuted by the blade and the water is fed from the storage container. After precipitating the pomace, the suspension is drained from the mixing chamber into a glass beaker. Subsequently the pomace remaining in the mixing chamber is flushed with water from the storage container into an integrated catch container.

Using the known device for producing the suspension, is very time consuming due to the required precipitation of the pomace. Additionally, the suspension is at a very high temperature when exiting into the glass beaker and can only be consumed after an additional waiting period.

US 2010/023209A1 discloses a method of the type recited supra for cooling coffee, wherein the mixing element initially mixes coffee powder and water into a pulp and the pulp is continuously stirred during a maturing period and subsequently pumped through a filter.

EP 3 068 274 B1 uses a similar device for producing a beverage using a powdery food supplement. The food supplement is fed from a rotatable magazine in portions together with water into a removable mixing chamber and both components are mixed by a mixing element integrated in the mixing chamber.

GB 790,969 A proposes a continuous method wherein meat fed through a funnel, is comminuted and pumped into a mixing chamber, cooked in the mixing chamber with hot steam and precipitated from the steam flow in a cyclone thereafter. DE 697 00 474 T2, AT 63 446 E, DE 699 24 362 T2 and DE 21 06 420 C disclose methods for preparing coffee and tea where water is pressed through coffee powder or a tea preparation without using any mixing elements.

BRIEF SUMMARY OF THE INVENTION

Thus, it is an object to the invention to accelerate the production of the suspension.

The object is achieved by a method for producing a suspension, comprising: comminuting portions of plant parts; mixing the plant parts with water so that the water and the plant parts form the suspension; separating a pomace left over from the plant parts from the suspension; and mashing the plant parts into a pulp while pressing the water under a positive pressure of 2 to 15 bar through the pulp and a filter that retains the pomace.

The components of the plant parts, in particular starch and protein are provided in the mashed pulp in high concentration, and are washed out by the water flowing through the pulp quickly. Thus, the production of the suspension is significantly accelerated.

In the known method, the mixing chamber always includes the entire amount of the finished suspension. Since the plant components are provided in a concentrated form as mash in the mixing chamber, the mixing chamber and thus the size of a device for performing the method according to the invention can be significantly reduced compared to known devices.

The method according to the invention is suitable for producing milk replacement products based on real nuts that include protein and fat like e.g. hazel nuts, walnuts, chestnuts, macadamia nuts, hemp and beechnuts, seeds like almonds and coconuts, grains like rice, oats, spelt and millet and additional seeds like soy, peanuts, cashews, lupines, Brazil nuts, pecans and pistachios and mixtures thereof.

The method according to the invention mashes the plant parts while water is being pressed through the pulp that is being generated. In the mixing chamber reduced in size over the prior art, the mixing element is in much more intense contact with the plant parts. Thus, producing the pulp and the suspension is further accelerated. The plant parts can be mashed in the mixing chamber before being impacted by the water in order to achieve and defined consistency. Furthermore, a prefabricated pulp can be placed into the mixing chamber.

Advantageously, the pulp runs through the filter in a turbulent flow according to the method according to the invention. Thus, depositing the pomace on the filter is prevented.

Advantageously, the plant parts include dry components, like shells, skins, spelts or awns. The dry components improve the cleaning properties of the pulp running through the filter.

Advantageously the method according to the invention heats the water and/or the pulp. The increased temperature favors flushing the components of the plant parts into the suspension. Additionally, the suspension can thus be instantly produced as a hot beverage.

Advantageously an emulgator is added to the suspension in a method according to the invention. The emulgator helps a formation of small fat droplets in the water and counteracts a de-mixing of the suspension. The fat droplets can be components of the plant parts in a method according to the invention, e.g. when using nuts. Soy lecithin can be used for the emulgator.

Additionally, oil can be added to the suspension according to the method according to the invention. Adding the oil helps to increase the fat content of the suspension.

According to the method according to the invention, the plant parts can be at least partially swelled, germinated, malted, fermented, enzyme treated, roasted and/or baked. The individual treatment of plant parts influences contents and taste of the suspension.

The object is also achieved by A device for producing a suspension, the device comprising: a mixing chamber; a mixing element arranged in the mixing chamber and configured to mix a portion of comminuted plant parts with water so that the water and the plant parts form the suspension; an outlet arranged at the mixing chamber and configured to let the suspension out of the mixing chamber so that a pomace left over from the plant parts is retained in the mixing chamber, wherein the mixing chamber is pressure tight besides the outlet and an inlet for the water, so that the water is pressable from the inlet through the mixing chamber under a positive pressure of 2 to 15 bar to the outlet, wherein the mixing chamber includes a filter configured as a perforated metal plate arranged upstream from the outlet and configured to retain the pomace, and wherein the mixing element generates a flow of the pulp through the filter.

The device according to the invention facilitates performing one of the recited methods according to the invention and is characterized by the advantages recited supra.

Advantageously the filter in the device according to the invention is a perforated metal plate. A perforated metal plate is easily adaptable to the method according to the invention by selecting a number and a geometry of the holes. A flow cross section of the plate controls a dwelling time of the suspension in the mixing chamber. On the other hand side, the smooth surface of the plate facilitates cleaning. Alternatively, the filter can be e.g. a wire mesh, a piece of cloth or fleece or a combination of these alternatives.

Advantageously the mixing element generates a flow of the pulp through the filter. The mixing element thus performs a dual technical function. The flow of the pulp can be induced alternatively or additionally by controlled injection of the water into the mixing chamber.

Advantageously, a device according to the invention includes a pressurization pump for the water. The water can then be supplied to the device without pressure. The pressurization pump can be in particular a piston pump. Alternatively, the pressurization pump can be a peristaltic pump. A device according to the invention of this type is particularly low maintenance. Further alternatively the water for the device can be supplied from a pressurized system, e.g. directly from a public drinking water grid.

Advantageously the device according to the invention includes a storage container for water. The store container can be integrated into the device or be removable.

BRIEF DESCRIPTION OF THE DRAWINGS

The invention is subsequently described based on an advantageous embodiment with reference to drawing figures, wherein.

DETAILED DESCRIPTION OF THE INVENTION

Figure 1:
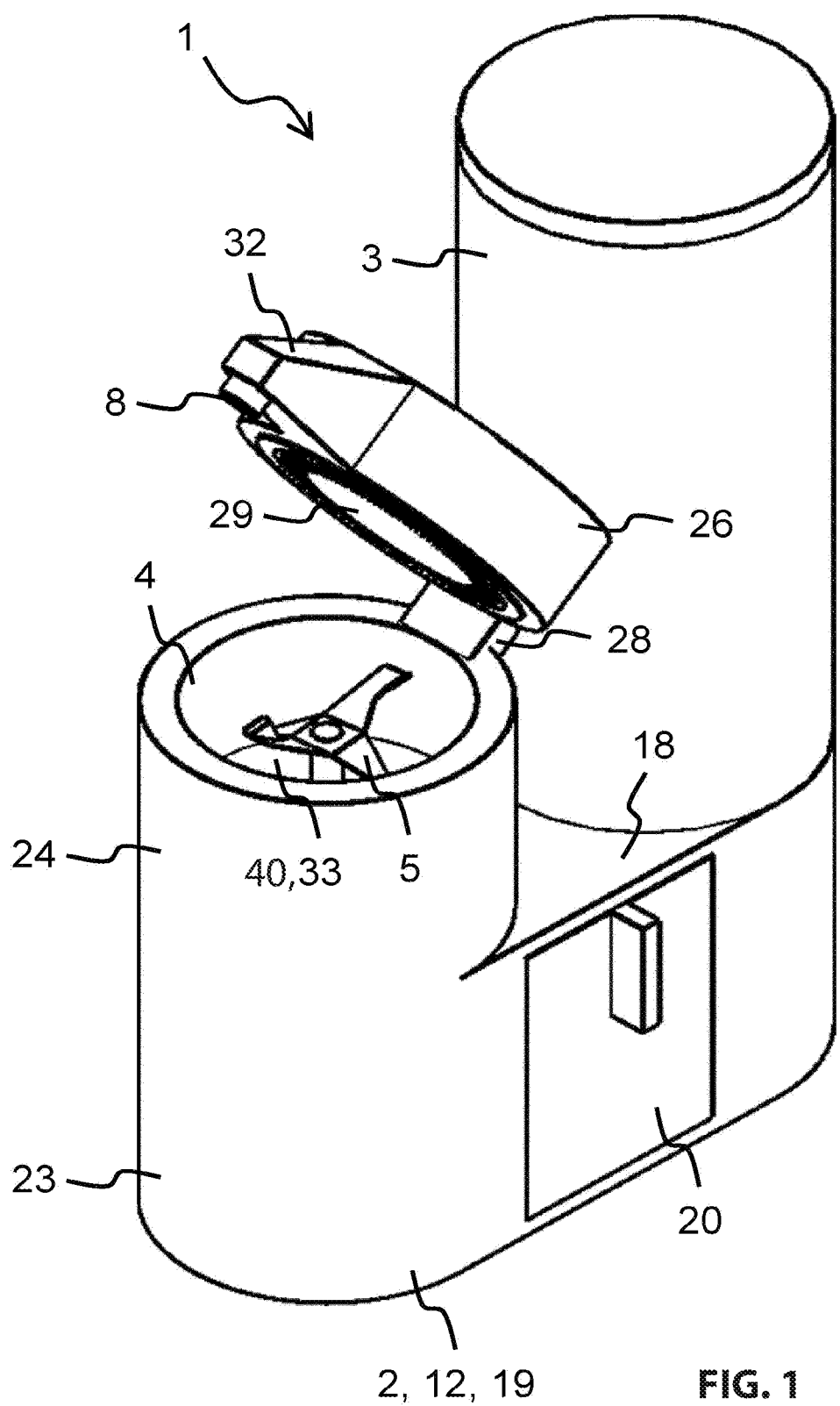
FIG. 1 illustrates a device according to the invention in an isometric view.
Figure 2:
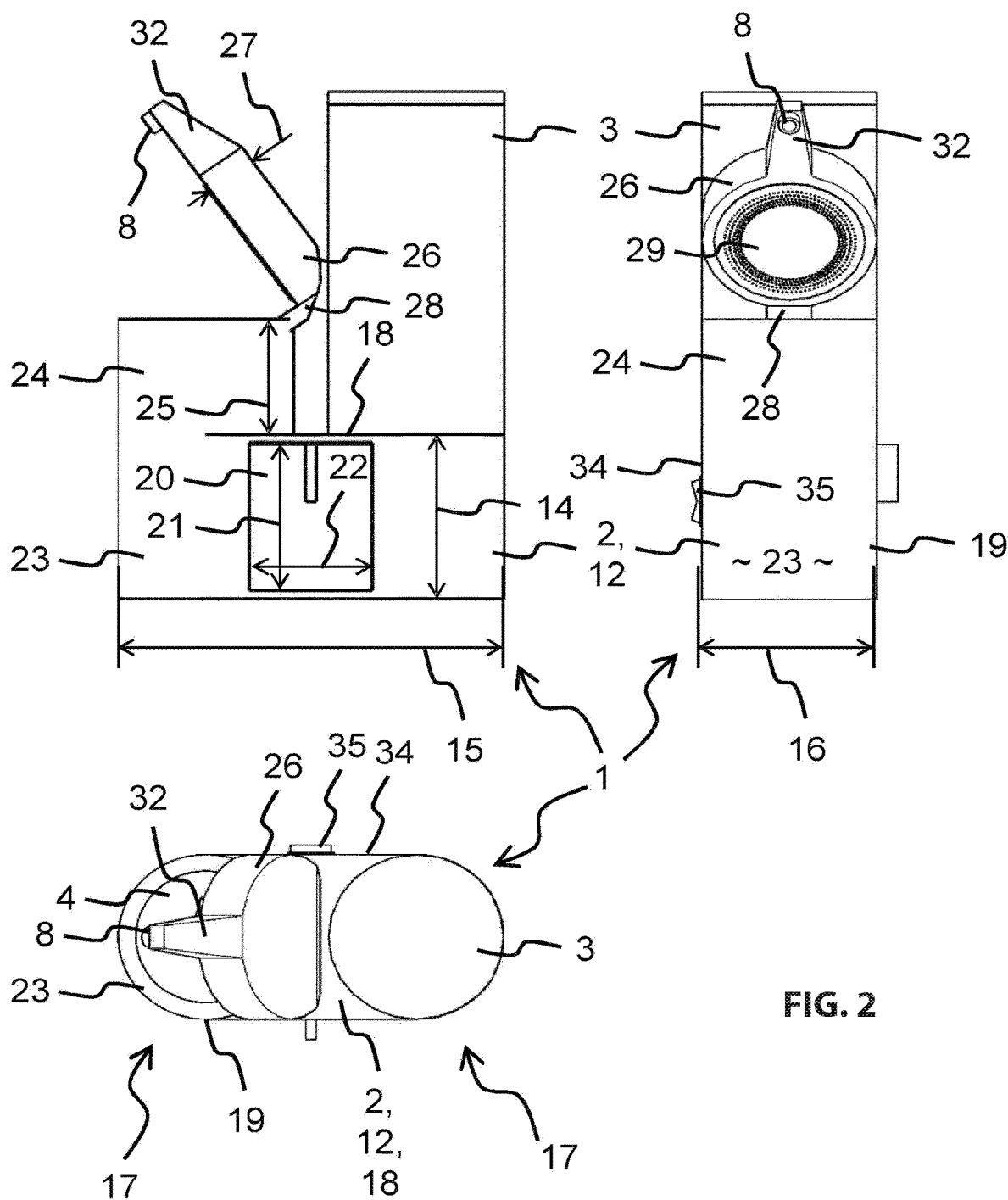
FIG. 2 illustrates the three views of the device according to the invention in orthogonal projection.
Figure 3:
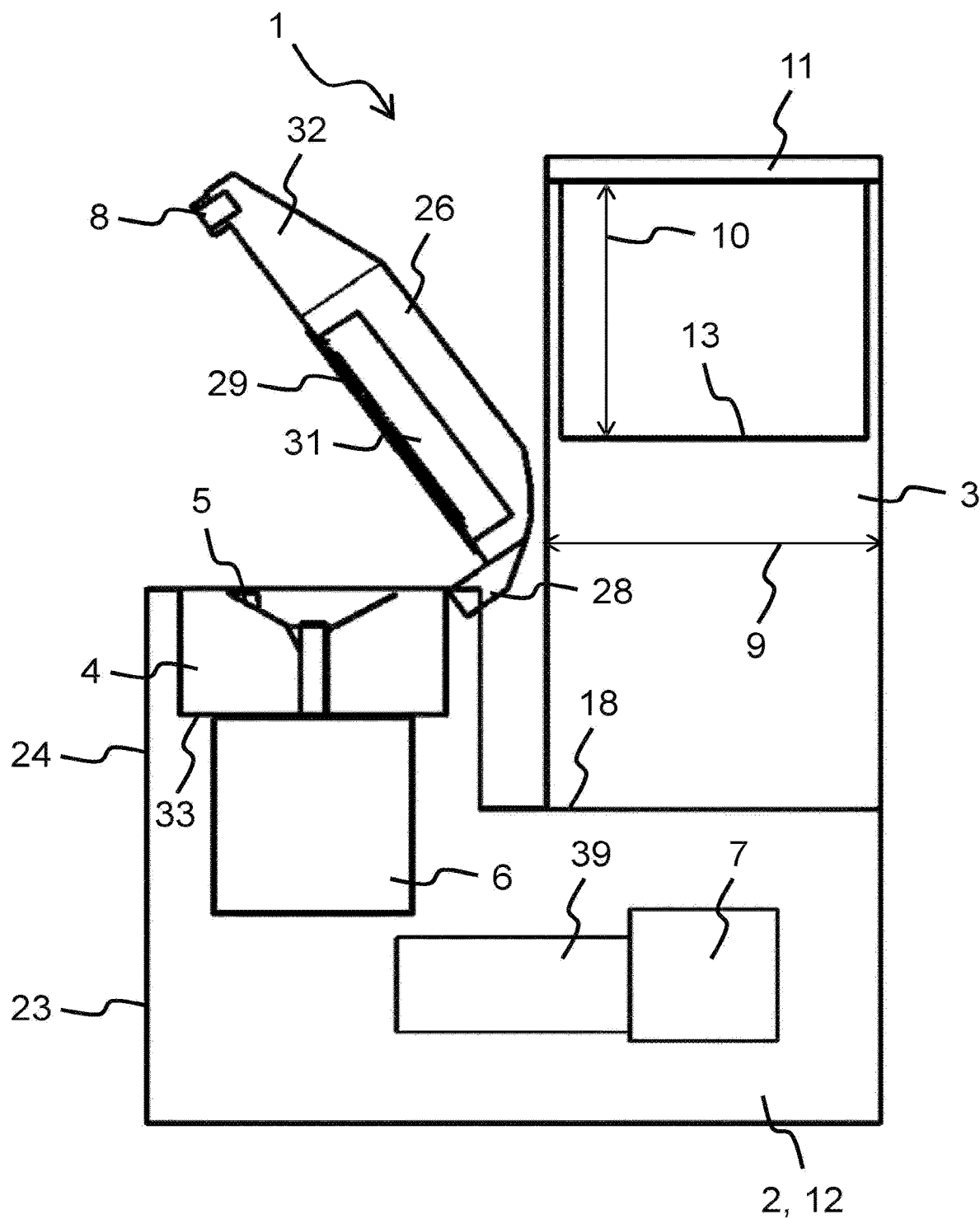
FIG. 3 illustrates a sectional view of the device according to the invention.
Figure 4:
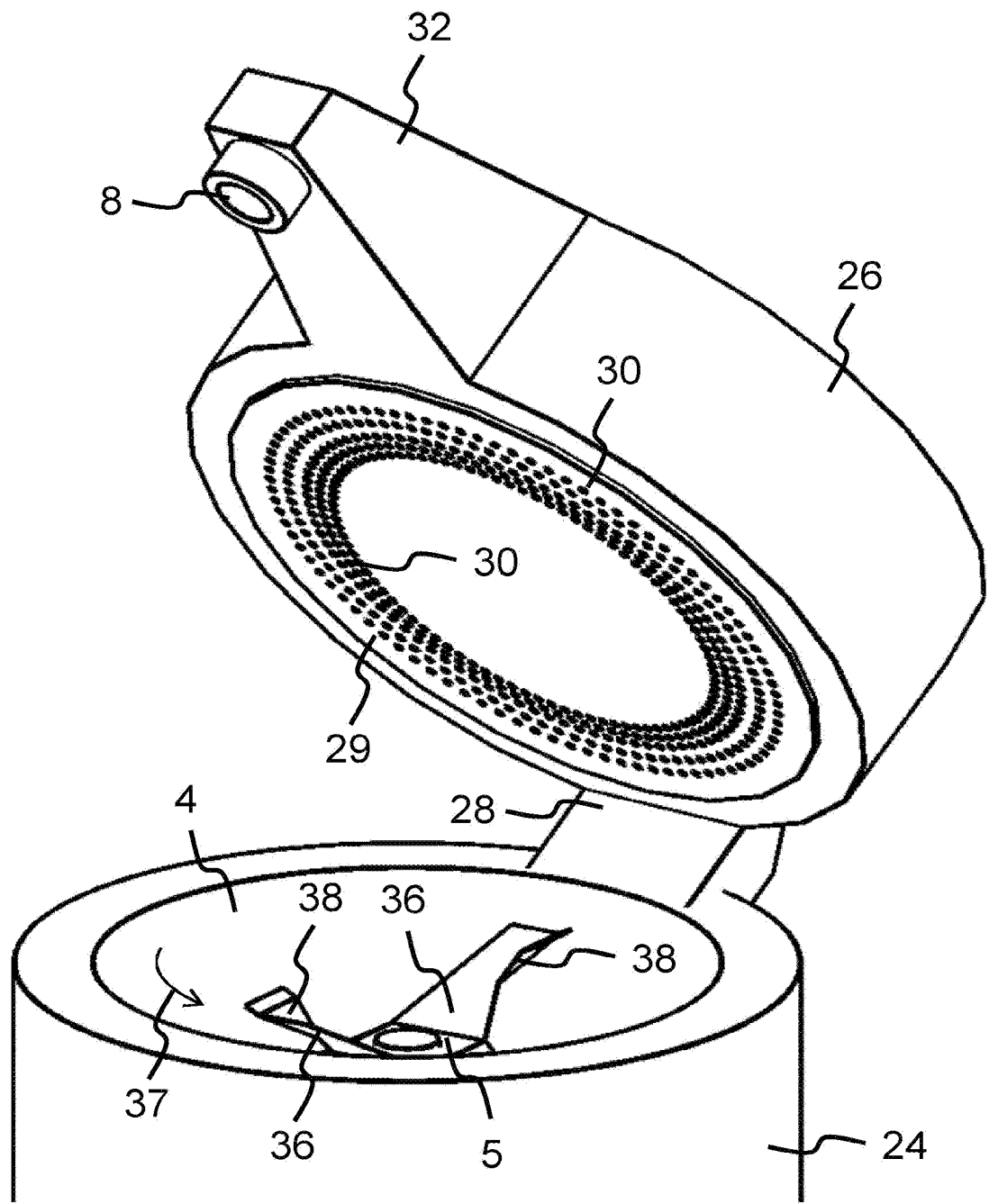
FIG. 4 illustrates a detail of the device according to the invention.

The device 1 according to the invention, shown in FIG. 1 includes a storage container 3 for water included in a housing 2, a mixing chamber 4, with a mixing element 5, a drive 6 for the mixing element 5 and a pressure pump 7 for pumping the water out of the storage container 3 into the mixing chamber 4 and an outlet 8 for letting a non-illustrated suspension out of the mixing chamber 4.

The storage container 3, is made from a translucent synthetic material and has a circular cylindrical shape with a diameter 9 of 100 mm, a height 10 of 200 mm and a wall thickness of 3 mm and a removeable cover 11. The storage container 3 is removeable from a base 12 of the housing 2 and includes a valve arranged at a floor 13, wherein the valve closes the removed storage container 3 tight and opens the storage container after being placed onto the base 12.

The base 12 has a cuboid shape with a height 14 of 100 mm, a length 15 of 220 mm and a width 16 of 100 mm and is convex at both ends 17 with cylindrical surfaces with a diameter 9 of the storage container 3. The base element 12 receives the storage container 3 at a rear end 17 on a top side 18.

The base 12 includes a removable pomace container 20 at a side surface 19. The pomace container 20 is made from a synthetic material and includes a shape of a half cylinder cut along a longitudinal axis having a height 21 of 90 mm and a diameter of 70 mm.

A front side 23 of the base 12 includes a cylindrical top 24 at a top side 18, wherein the cylindrical top 24 has a diameter 9 of the storage container 3 and a height 25 of 70 mm and includes the mixing chamber 24. The top 24 transitions upward into a cover 26 with a height 27 of 30 mm. The cover 26 is connected with the top 24 by a hinge 28 and pivotable towards the storage container 3.

The cover 26 includes a filter 29 which closes the mixing chamber 4 pressure tight when the cover 26 is closed. The filter 29 is made from a steel plate and includes approximately 200 holes 30 with a diameter of 0.3 mm. The cover 26 includes a collection chamber 31 above the filter wherein the collection chamber leads into the outlet 8 at a lug 32 that is applied to a front of the cover 26.

A water conduit in the base 12 runs from the valve of the storage container 3 through the pressure pump 7 into the mixing chamber 4. The pressure pump 7 is an electric piston pump with a pumping power of 650 ml per minute with an output pressure of 15 bar at the most.

A pomace channel runs in the base 12, from the floor 33 of the mixing chamber 4 into the pomace container 20. The pomace channel is connected to the mixing chamber 4, by a valve flap. Last not least, the base 12 includes an electric motor with a power of 600 watts at a speed of 20,000 RPM below the mixing chamber 4 as a drive 6 for the mixing element 5 and a control unit and a rocker switch 35 at a side surface 34 oriented away from the pomace container 20.

The mixing element 5 in the mixing chamber 4 is a rotating blade made from stamped and bent sheet metal including two downward protruding arms and two upward bent arms 36. Additional vortex surfaces 38 are formed at rear edges with respect to the rotation direction 37 of the upward bent arms 36 that are oriented towards the filter 29. An additional heater 39 is attached at the water conduit.

In order to start the device 1 according to the invention and perform a method according to the invention, the storage container 3 is initially filled with water and placed onto the base 12. Then, the valve is opened and the water conduit is filled with water. A non-illustrated sensor at the water conduit reports the water level to the control unit. Then a prepared portion of plant parts, namely 40 g of almonds is placed in the open mixing chamber 4 and the mixing chamber 4 is closed by the cover 26.

A sensor at the cover 26, reports pressure tight closure of the mixing chamber 4 for the control unit which chops the plant parts dry, using the mixing element 5 for a duration of 5 seconds and comminutes the plant parts and subsequently pumps 150 ml water into the mixing chamber 4 using the pressure pump 7 while the mixing element 5 is still rotating.

While the water flows through the pulp, starch and protein included therein are dissolved so that a suspension is formed. Fat from the pulp is distributed in the flowing water as small droplets. The turbulence surfaces 38 at the mixing element 5 prevent deposition of the remaining pomace on the filter 29. The suspensions runs through the filter 29 and the collection chamber 31 and out of the outlet 8 and is captured in a beverage container.

Subsequently the flap valve to the pomace channel is opened while the mixing element 5 is still rotating and the pressure pump 7 is still running and the pomace remaining in the mixing chamber 4 and on the filter 29 is flushed into the pomace container 20.

When using different plant parts, the volumes and times for producing the suspension can differ and/or the dry initial comminution before adding the water can be omitted. The water is heat able continuously variably up to 80 degrees C. in order to produce the hot beverage,

REFERENCE NUMERALS AND DESIGNATIONS 1 device
2 housing
3 storage container
4 mixing chamber
5 mixing element
6 drive
7 pressure pump
8 outlet
9 diameter of storage container
10 height of storage container
11 cover of storage container
12 base of housing
13 floor of storage container
14 height of base
15 length of base
16 width of base
17 end of base
18 top side of base
19 side surface
20 pomace container
21 height of pomace container
22 diameter of pomace container
23 front side of base
24 top
25 height of top
26 cover
27 height of cover
28 hinge
29 filter
30 hole
31 collection chamber
32 lug
33 base of mixing chamber
34 side surface
35 rocker switch
36 arm
37 rotation direction of mixing element
38 vortex surface
39 heating element
40 inlet

What is claimed is:

1. A method for producing a milk replacement product, the method comprising:
    comminuting portions of plant parts from real nuts, seeds, and/or additional seeds,
    wherein the real nuts include walnuts, chestnuts, macadamia nuts, hemp, and beechnuts,
    wherein the seeds include almonds, coconuts and grains including rice, oats, spelt and millet,
    wherein the additional seeds include soy, peanuts, cashews, lupines, Brazil nuts, pecans, and pistachios, and
    wherein the plant parts include protein and fat;
    mixing the plant parts with water so that the water and the plant parts form the milk replacement product;
    separating a pomace left over from the plant parts from the milk replacement product; and
    mashing the plant parts into a pulp while pressing the water through the pulp and a filter under a pressure of 2 to 15 bar, wherein the filter retains the pomace.

2. The method according to claim 1, wherein the pulp flows through the filter in a turbulent flow.

3. The method according to claim 2, wherein the plant parts include dry components configured as shells, skins, spelts or awns.

4. The method according to claim 1, further comprising heating the water and/or the pulp.

5. The method according to claim 1, further comprising: adding an emulgator and/or an oil to the milk replacement product.

6. The method according to claim 1, further comprising: malting and/or baking the plant parts are at least partially.

* * * * *